US005312607A

United States Patent [19]

Schiabel et al.

[11] Patent Number: 5,312,607

[45] Date of Patent: May 17, 1994

[54] PROCESS FOR THE SORPTION OF RESIDUAL GAS BY MEANS BY A NON-EVAPORATED BARIUM GETTER ALLOY

[75] Inventors: Antonio Schiabel; Claudio Boffito, both of Milan, Italy

[73] Assignee: SAES Getters S.p.A., Milan, Italy

[21] Appl. No.: 89,630

[22] Filed: Jul. 12, 1993

Related U.S. Application Data

[63] Continuation of Ser. No. 854,567, Mar. 20, 1992, abandoned.

[30] Foreign Application Priority Data

Apr. 16, 1991 [IT] Italy .......................... MI91A001036

[51] Int. Cl.[5] .............................................. B01J 8/06

[52] U.S. Cl. ................................ 423/210; 252/181.4; 252/181.7; 313/481; 313/561; 423/219; 423/235; 423/239.1; 423/247

[58] Field of Search .................... 423/239.1, 219, 210, 423/247, 235; 252/181.4, 181.7; 313/481, 561

[56] References Cited

U.S. PATENT DOCUMENTS

| | | | |
|---|---|---|---|
| 859,021 | 7/1907 | Soddy | 252/181.7 |
| 1,922,162 | 8/1933 | King | 313/561 |
| 1,925,076 | 8/1930 | Johannes | 252/181.7 |
| 2,000,740 | 5/1935 | Hall Brophy | 252/181.7 |
| 2,018,965 | 10/1935 | McQuade | 252/181.7 |
| 2,624,450 | 1/1953 | Britten et al. | 252/181.4 |
| 4,203,049 | 5/1980 | Kuus | 252/181.6 |

FOREIGN PATENT DOCUMENTS

| | | | |
|---|---|---|---|
| 0700121 | 12/1964 | Canada | 252/181.7 |
| 6205764 | 1/1987 | Japan . | |
| 1226728 | 3/1971 | United Kingdom | 313/481 |

OTHER PUBLICATIONS

Joseph Babor, Busic College Chemistry, 2nd Ed., 1953 p. 256.

*Primary Examiner*—Michael Lewis
*Assistant Examiner*—Wendy Lovern
*Attorney, Agent, or Firm*—David R. Murphy

[57] ABSTRACT

The process of the present invention provides for the sorption of residual gas in a vessel by means of a non-activated, non-evaporated barium getter. It comprises the steps of reducing an alloy of $Ba_z+(Ba_{1-x}A_x)_nB_m$ to a particle size of less than 5 mm, under vacuum or an inert gas atmosphere and then placing the particulate alloy in the vessel. Upon exposing the particulate alloy to the residual gas in the vessel at room temperature the gas is sorbed. The metal A is a metal selected from the group consisting of elements of Group IIa of the periodic table of elements, excluding barium. The metal B is selected from the group consisting of elements of Group Ib, IIb, IIIa, IVa and Va of the periodic table of elements. Furthermore n=1, 2, 3 or 4 and m=1, 2 or 5, whereas $o \leqq X \leqq 0.5$ and z is a value from zero to such a value that the total barium in the alloy is less than 95% by weight of the alloy.

14 Claims, 8 Drawing Sheets

PROCESS FOR THE SORPTION OF RESIDUAL GAS BY MEANS BY A NON-EVAPORATED BARIUM GETTER ALLOY

This application is a continuation of application, Ser. No. 07/854,567, filed Mar. 20, 1992, now abandoned.

FIELD OF THE INVENTION

The present invention relates to a process for a sorbing residual gases by means of a non-evaporated barium getter.

BACKGROUND

Barium getters are well known in the art. In the form of the more or less pure element barium was placed inside a metal container to protect it from reaction with the atmosphere. Then, when required to be used, it was mounted inside a vacuum device where, after partial evacuated and seal-off of the device, the barium was caused to evaporate. The barium, after evaporation, deposited in the form of a thin film within the vacuum device where it sorbed residual or unwanted gases throughout the life of the device.

While these getter devices released barium they were also found to release a large amount of unwanted gases that had been picked up during storage or handling. This was due to the getter material being barium in the form of an element which is reactive with gases.

In order to reduce the reactivity of the barium, it was then alloyed with one or more metals. Such alloys were inter alia Ba-Mg, Ba-Sr-Mg, Ba-Mg-Al. See for example the book "Getterstoff und Ihre Anwendung in the Hochvackuumtechnik" by M. Littmann. E. Winter's-che Verlagshandlung. Leipzig 1939. One of the most successful was the alloy $BaAl_4$ having a weight percent of barium from 40 to 60 percent. Such an alloy is very inert and, as with all inert barium alloys, it must be evaporated before it can sorb gases. It can be caused to dissociate and release barium by means of applying heat to the $BaAl_4$ alloy alone but more recently it has become widespread to mix the $BaAl_4$ with an approximately equal weight of nickel. These two materials, in powder form, when heated react exothermically to form a solid residue of Ni-Al and evaporated Ba. However, these getter materials have to be heated to about 800° C. before the exothermic reaction starts, whereupon they reach 1000° C., and more, when there is the sudden release of heat on reacting exothermically.

In Japanese Patent publication number SHO 42-4123 the barium-aluminium (about 50% Ba) alloy is mixed with, preferably, 15% by weight of powdered tin to produce getters. Said getters are heated by means of high frequency at about 600° C. for one minute during the exhaust process. As a result of the reaction which may be produced by said heating, it is considered that $BaSn_2$ may be produced, or liberated barium is produced from the barium-aluminium alloy by reaction of aluminium and tin. In either case, a mixed getter material of barium-aluminium alloy and tin which is stable at a normal temperature is activated and absorbs gases at a normal temperature. Nevertheless there is a heating process involved which requires temperatures of several hundreds of degrees centigrade. Furthermore an uncontrolled chemical reaction is taking place.

Another family of getter devices has been based upon the elements zirconium or titanium. Powdered Zr 84%-Al 16%, $Zr_2Fe$ and $Zr_2Ni$ are among these. They are known as non-evaporable or non-evaporated getters because they do not require any of their component elements to be evaporated in order to become capable of sorbing gas. However they do require heating to a high temperature to make them gas sorptive. This is because they are covered with surface layers of oxides and nitrides which passivate them and render them inactive. Upon heating, in vacuum, the passivating layers diffuse into the bulk material and the surface becomes clean and active. This heating process usually takes place at a high temperature say 900° C. for about 10–30 seconds. This temperature can be reduced but requires a longer time, for instance several hours at 500° C.

Even more recently non-evaporated getters based on Zr-V have been used. Such alloys as Zr-V-Fe and Zr-V-Ni have gained widespread acceptance as "low temperature" activatable non-evaporated getters. By low temperature activatable it means that a significant proportion of their gettering activity already becomes available within a relatively short time at moderate temperatures. It is believed that this is due to the ease with which the surface layers of passivating materials may diffuse into the bulk material at these relatively low temperatures. Whatever the reason for their ability to become active at these relatively low temperatures of 400°–500° this can still be an undesirably high temperature under many circumstances. All these gas sorptive materials have been used in admixture with other materials, both gas sorptive or not in an attempt to lower their temperature of activation.

There are many occasions in which it is desirable to remove residual or unwanted gases from a vessel which under no circumstances can be allowed to be subjected to a high temperature. Such may be the case for instance when the vessel is made of organic plastic or contains components of organic plastic. The organic plastic may melt and even if the organic plastic does not melt it may reach such a temperature that it starts to decompose or at least give off a large amount of gas which may be hydrocarbons or other organic gases. If these are sorbed by the getter material, this causes their premature failure as they only have a finite gettering power or ability to sorb a fixed quantity of gas. The rapid sorption of a large amount of gas impairs their ability to later sorb gas during the life of the device in which they are employed. Otherwise there remains too high a gas pressure for the device to work as intended. This temperature may be as low as about 150° C. At these temperatures, and lower, oxygen and water vapour permeation can be a problem.

Although it has been suggested that non-evaporated getters can be introduced into the device in a preactivated form, that is when they have already been heated to a high temperature, they have already been subject to many manufacturing processes such as grinding to fixed particle size, mixing with other materials, compaction and forming into pellets.

BRIEF OBJECTS OF THE INVENTION

It is therefore an object of the present invention to provide a process for the sorption of residual gas in a vessel which is free from one or more of the disadvantaged of prior art processes.

It is another object of the present invention to provide a process for the sorption of residual gas in a vessel which does not require the getter material to be activated.

It is yet another object of the present invention to provide a process for the sorption of residual gas in a vessel which does not require the getter to be mixed with other materials. Another object of the present invention is to provide a process for the sorption of residual gas in a vessel which can be used in vessels made of, or containing, organic plastic.

A further object of the present invention is to provide a process for the sorption of residual gas in a vessel which does not require temperatures of greater than 150° C.

Yet a further object of the present invention is to provide a process for the sorption of oxygen gas in a vessel made of organic plastic which or contains organic plastic material.

These, and other objects and advantages of the present invention will become clear to those skilled in the art by reference to the following description thereof and drawings wherein:

DETAILED DESCRIPTION OF THE INVENTION

Figure 1:
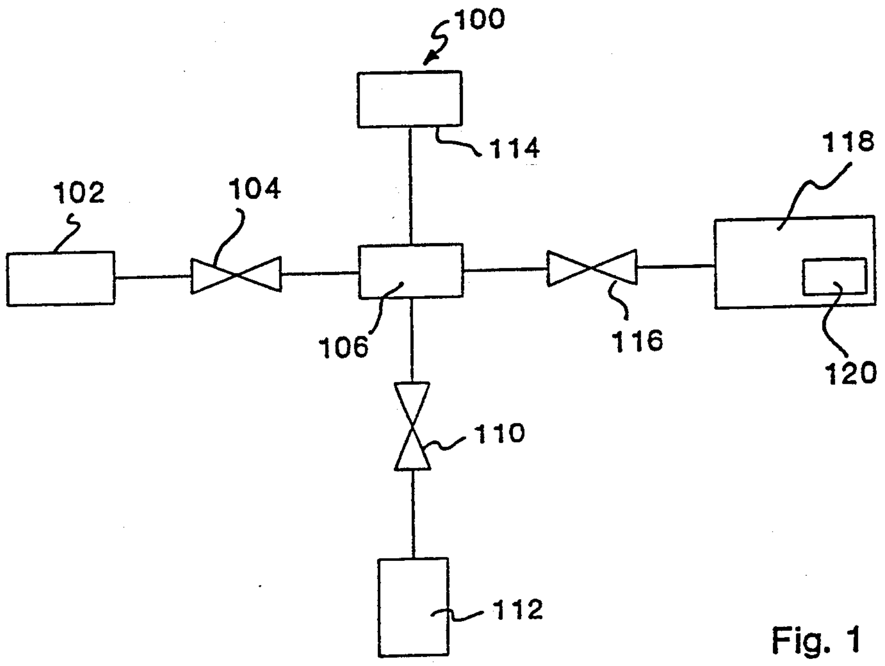
FIG. 1 is a drawing showing in a schematic form an apparatus for measuring the sorption properties of alloys useful in providing a process of the present invention.

The process of the present invention provides for the sorption of residual gas in a vessel by means of a non-activated, non-evaporated barium getter. It comprises the step of comminuting or reducing an alloy of $Ba_z+(Ba_{1-x}A_x)_nB_m$ to a particle size of less than 5 mm, under vacuum or an inert gas atmosphere and then placing the reduced alloy in the vessel. Upon exposing the reduced alloy to the residual gas in the vessel at room temperature the gas is sorbed. The metal A is a metal selected from the group consisting of elements of Group IIa of the periodic table of elements, excluding barium. The metal B is selected from the group consisting of elements of Group Ib, IIb, IIIa, IVa and Va of the periodic table of element. Furthermore n=1, 2, 3 or 4 and m=1, 2 or 5, whereas $0 \leqq x \leqq 0.5$ and z is a value from zero to such a value that the total barium in the alloy is less than 95% by weight of the alloy.

The alloys of the present invention do not have to be activated, that is they are already capable of sorbing gases at room temperature and furthermore they do not have to be evaporated to produce a film of active material, such as barium, before they sorb gas. The alloys can be described by the general formula $Ba_z+(Ba_{1-x}A_x)_nB_m$, where A is a metal selected from the group consisting of elements of Group IIa of the periodic table of elements, excluding barium. The numbering of the Group of elements is that adopted by The American Chemical Society. Thus A can be calcium, magnesium and strontium but is preferably calcium as calcium is only slightly less reactive than barium. Magnesium and strontium are less preferred because of their lower reactivity. The value of x may be as low as zero such that there no metal of Group IIa present (except the barium). On the other hand it may be as high a 0.5. Above about 0.5 the alloy begins to lose its ability to react at room temperature with the residual gas at a sufficiently high sorption speed.

The element B is any metal selected from the group consisting of elements of Group Ib, IIb, IIIa, IVa and Va of the periodic table of elements. Of Group Ib copper is preferred as it is less costly than either silver or gold. In case where economics are of minor importance silver would be acceptable. Members of Group IIb may also be used although zinc is to be preferred as both cadmium and mercury present difficulties is handling on ecological grounds. Similarly members of Group IIIa can be adopted but aluminium is preferred as it is readily available and extremely cheap, while gallium is liquid near ambient temperatures and indium forms an intermetallic compound which is already very difficult to reduce to a particulate. Of Group IVa, silicon, tin and lead appear to be satisfactory whereas germanium is generally only available in extremely high purity and is therefore very expensive. The metals of Group Va could be used but arsenic is well known for its toxicity and both antimony and bismuth lead to alloys with a reduced sorption capacity.

The values of n and m are chosen such that the composition of the intermetallic compound $Ba_nB_m$ is that compound given in the book "The Handbook of Binary Phase Diagrams", Genum Publishing Corporation and "The Constitution of Binary Alloys" and its relative Supplements, which has the highest barium content. For instance in the binary system Al-Ba this compound is $Ba_4Al_5$ where n=4 and m=5. In the Ba-Cu system the compound is $Ba_1Cu_1$ so that n=1 and m=1. In the cases of Ba-Zn and Ba-Pb the intermetallic compounds that have the highest barium content are $Ba_2Zn$ and $Ba_2Pb$ respectively so that in both cases n=2 and m=1. For the system Ag-Ba there is $Ba_3Ag_2$ such that n=3 and m=2.

These intermetallic compounds can be easily reduced to a particulate form without any difficulty. For instance they can be comminuted to less than 5 mm in diameter by known techniques under a vacuum or inert atmosphere and then transferred to the vessel containing the residual gas which is desired to be removed. This is accomplished by placing the comminuted alloy in the vessel and exposing the comminuted alloy to the residual gas at room temperature.

The comminuted alloy can be transferred to the vessel immediately but preferably takes place by means of an intermediate vessel in which the alloy is stored under vacuum or an inert atmosphere until it is required.

Surprisingly they immediately start to sorb large amount of unwanted gas.

When z=0 the alloy according to the present invention is $(Ba_{1-x}A_x)_nB_m$. This alloy may be made slightly less than stoichiometric in the $(Ba_{1-x}A_x)$ component with respect to the $B_m$ component, such that there is also present an intermetallic compound with less barium. It can also be made with excess barium. This leads to the formula for the alloy of $Ba_z+(Ba_{1-x}A_x)_nB_m$, where $0 \leqq z \leqq$ such a value that the total weight of barium present in the alloy is not greater than about 95%. If present in greater amounts the alloy is difficult to reduce to particulate form. The $B_z$ in excess may be partially replaced with the metal A.

The invention may be better understood by reference to the following examples wherein all parts and percentages are by weight unless otherwise indicated. These examples are designed to teach those skilled in the art how to practice the present invention and represent the best mode presently known for practicing the invention.

EXAMPLE 1

This example is not representative of the present invention but is designed to show an apparatus suitable for measuring the gas sorption properties of alloys suitable for practicing processes of the present invention. FIG. 1 is a drawing showing in a schematic form an apparatus 100 for measuring the sorptive properties of $Ba_z+(Ba_{1-x}A_x)_nB_m$ alloys useful in the present invention. A vacuum pumping system 102 is connected by means of a first valve 104 to a dosing volume 106. Connected with dosing volume 106 there is a second valve 110 for the inlet of a test gas from a test gas reservoir 112 and a pressure measuring gage 114. To dosing volume 106 is also connected, by third valve 116, a test chamber 118 containing the sample 120 under test.

In operation valves 110 and 116 are closed and 104 is opened and the vacuum pump system 102 pumped the system down to $10^{-6}$ mbar. For all tests the dosing volume 106 was a volume of 0.6 liter. A sample of powdered alloy 120, contained within a glass bulb test chamber 118 of approximately 0.2 liter volume (depending upon the sample), under an inert atmosphere of argon gas was attached to apparatus 100 via valve 116 (closed). Valve 116 was opened and again the system was pumped down to $10^{-6}$ mbar while the sample was held at about 100° C. for 20 minutes which simulates a process to which the getter may be subjected. Valves 104 and 116 were then closed and test gas was admitted to dosing volume 106, from gas reservoir 112, by opening valve 110 for a short while. The pressure was noted on pressure gauge 114, and was arranged to be such that the pressure was about 0.1 mbar, after opening valve 116 to introduce a dose of test gas to the sample 120.

EXAMPLE 2

This example was designed to show how to manufacture an alloy useful in the process of the present invention.

In an iron crucible were placed 121.8 g of commercial grade barium (purity greater than 98%) obtained from Degussa together with 28.2 g of plates of electrolytic copper. The crucible was placed in an induction furnace and heated under an argon atmosphere at 500 mbar pressure with medium frequency induction heating until the mixture was thoroughly melted and homogeneous thus forming a fusion. The fusion was then poured into a cold copper mould and allowed to cool to room temperature while still under the protective atmosphere of argon. The weight of alloy after fusion was 149 grams.

The alloy corresponds to a composition Ba+BaCu where the intermetallic compound $Ba_1Cu_1$ is in alloy form with an excess of barium such that the total weight percentage of barium is 81.2% i.e., less than 95%.

EXAMPLE 3

This example was designed to show the use of an alloy in the process of the present invention.

Figure 2:
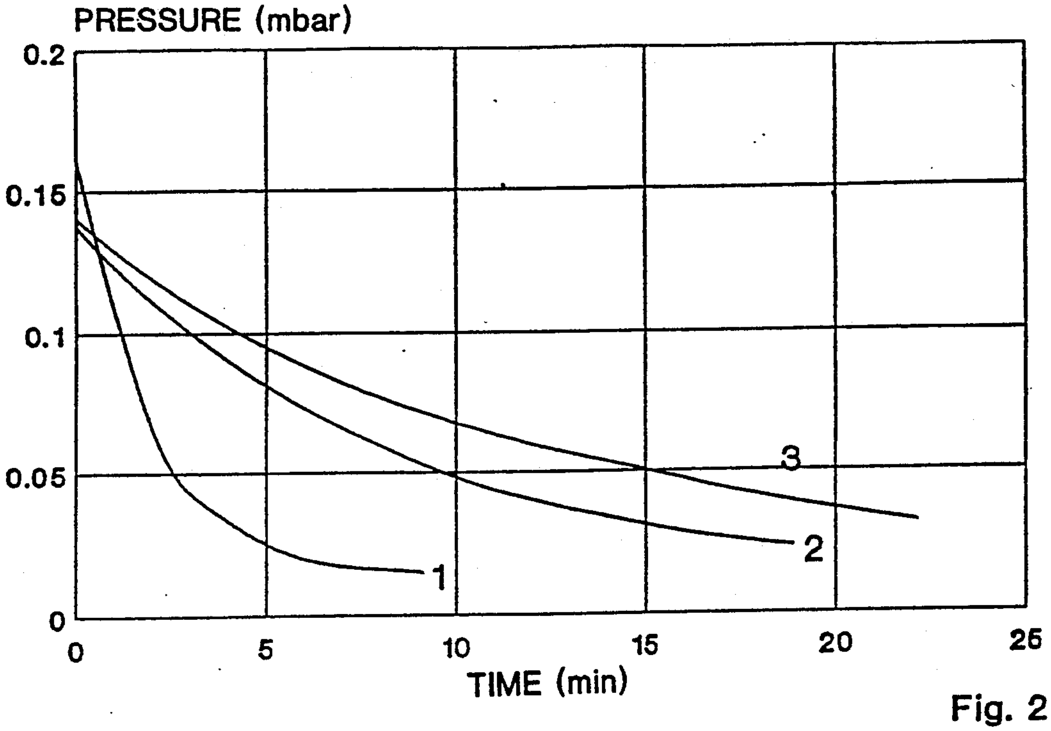
FIGS. 2-5 show the results of sorption tests performed on an alloy of barium-copper of the present invention, FIG. 6 show the gas sorption speed derived from the curves of FIGS. 2-5 as a function of the quantity of gas sorbed.
Figure 3:
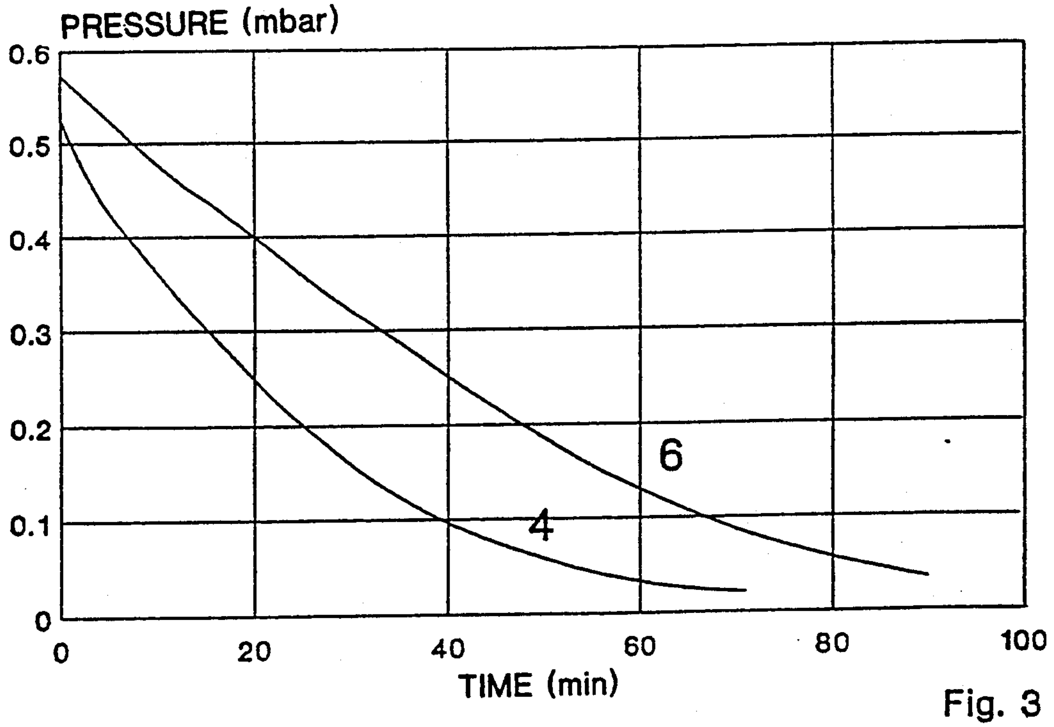
Figure 4:
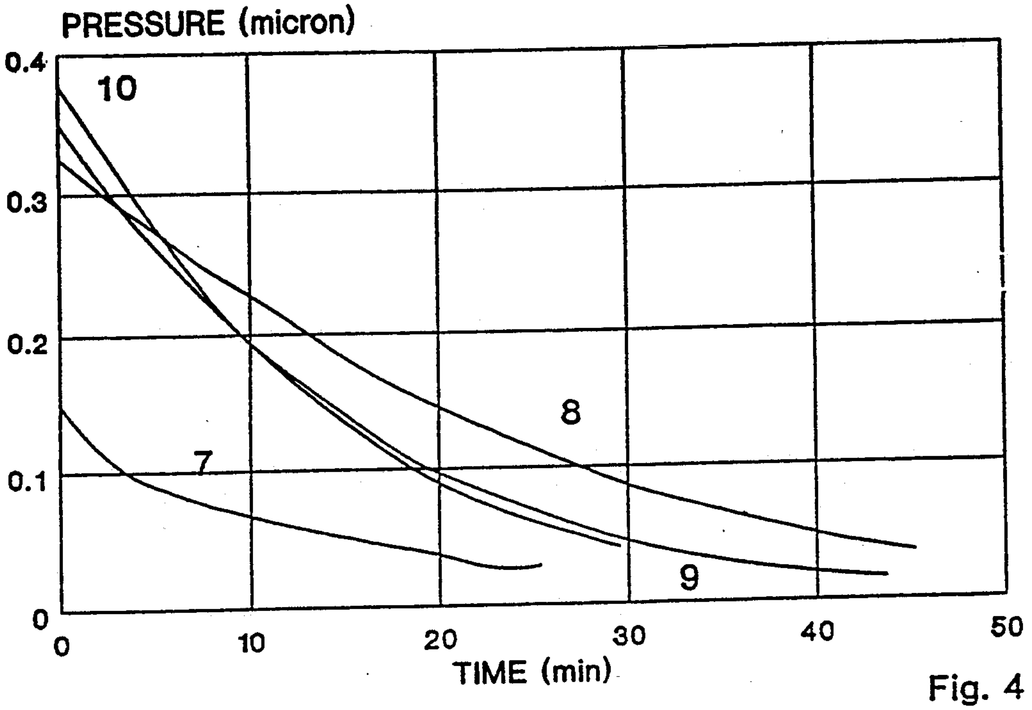
Figure 5:
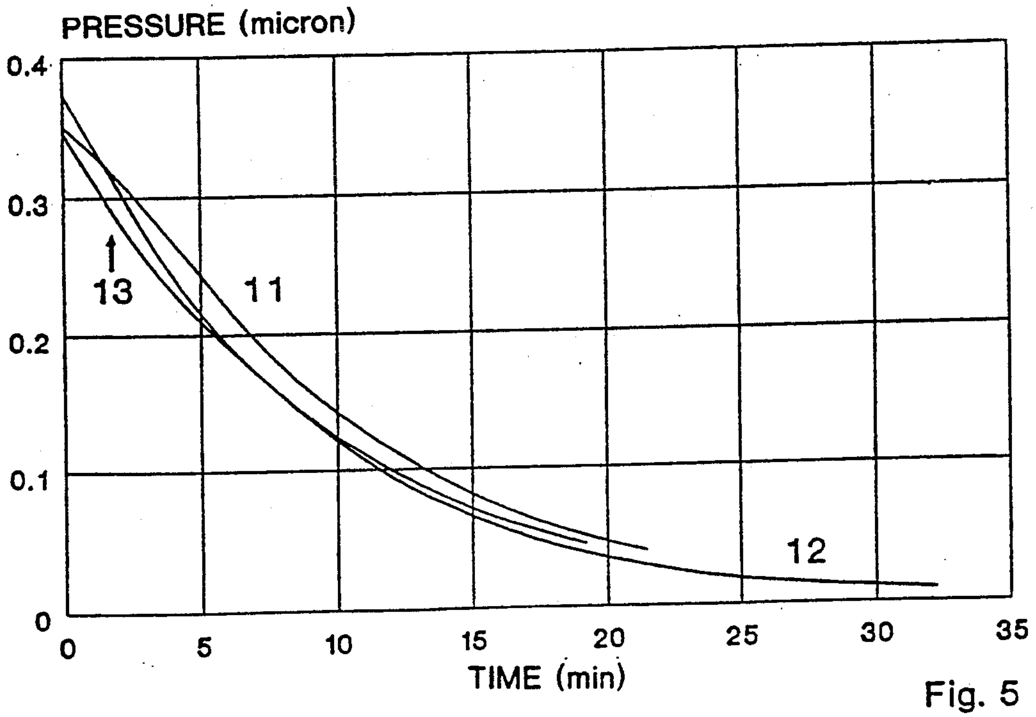
Figure 6:
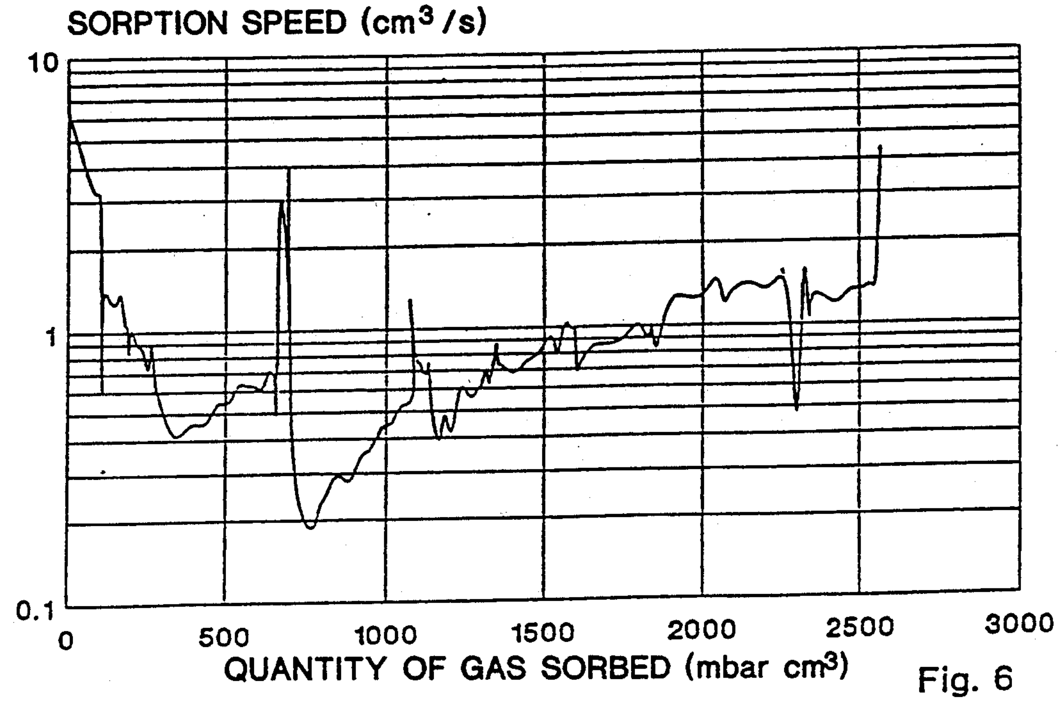

A barium-copper alloy as prepared in Example 2 above was placed in a glove-box under a protective atmosphere of argon at slightly greater than 1 atmosphere pressure. The alloy was ground using a mortar and pestle to a particle size of less than 3 mm and a sample of 5 g was sealed in a glass vessel of volume 0.13 liter. The sample in the glass vessel was then attached as test chamber 118 to the test apparatus of Example 1. The procedure of example 1 was followed and a first dose of gas, in this case oxygen, was introduced to the sample. The pressure in the vessel was measured by means of pressure gauge 114 as a function of time. The curve obtained is reported on FIG. 2 a curve 1. A further 12 successive doses were introduced and each time the curve was measured as function of time. The curves are reported as curves 2 to 13 on FIGS. 2 to 5. FIG. 6 shows the gas sorption speed derived from the curves of FIGS. 2–5 by differentiation, as a function of the quantity of gas sorbed.

EXAMPLE 4

This example was designed to show how to manufacture another alloy useful in the process of the present invention. 480.4 g of commercial grade barium (purity greater than 98%) obtained from Degussa was placed in an iron crucible together with 76.3 g of electrolytic zinc (purity greater than 99.9%) obtained from Merck. The crucible was placed in an induction furnace and heated under an argon atmosphere at 500 mbar pressure with medium frequency induction heating until the mixture was thoroughly melted and homogeneous thus forming a fusion. The fusion was then poured into a cold iron mould and allowed to cool to room temperature while still under the protective atmosphere of argon. The weight of alloy after fusion was 549.4 g. The alloy corresponds to a composition $Ba+Ba_2Zn$ where the intermetallic compound $Ba_2Zn$ is an alloy formed with an excess of barium such that the total weight percentage of barium is 86.3% i.e., less than 95%.

EXAMPLE 5

Figure 7:
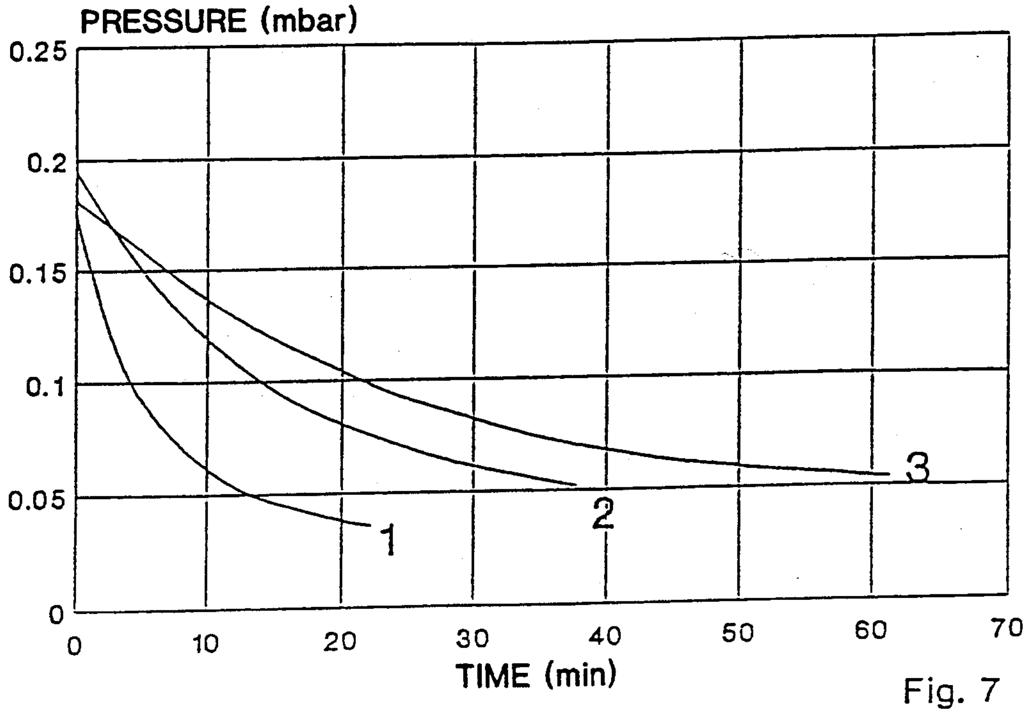
FIG. 7 shows the results of sorption tests performed on an alloy of barium-zinc of the present invention.
Figure 8:
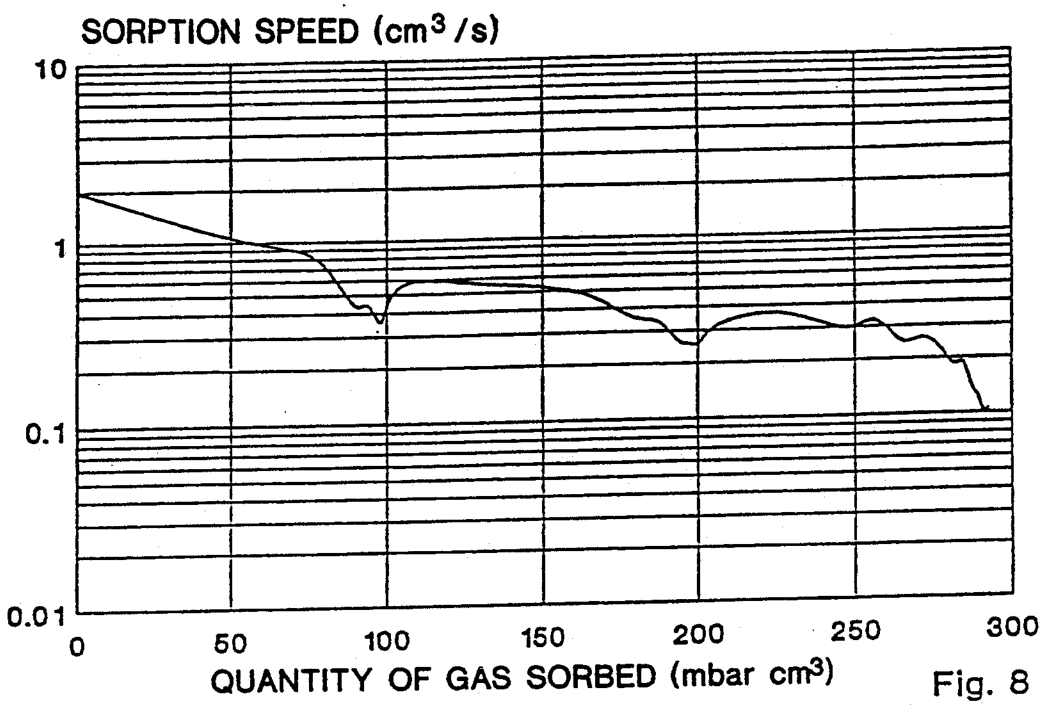
FIG. 8 shows the gas sorption speed derived from the curves of FIG. 7 as a function of the quantity of gas sorbed.

This example was designed to show the use of the alloy produced as in Example 4 in the process of the present invention. A barium-zinc alloy as prepared in Example 4 above was placed in a glove box under a protective atmosphere of argon at slightly greater than 1 atmosphere pressure. The alloy was ground to a particle size of less than 3–4 mm with a pestle and mortar and a sample of 1.85 g was sealed in a glass vessel of volume 0.05 liter. The sorption properties were measured as in Example 3, and are reported in FIG. 7. FIG. 8 shows the gas sorption speed derived from the curves of FIG. 7 as a function of the quantity of gas sorbed.

EXAMPLE 6

This example was designed to show how to manufacture yet another alloy useful in the process of the present invention. 260.7 g of commercial grade barium (purity greater than 98%) obtained from Degussa was placed in an iron crucible together with 196.7 g of lead pellets (purity greater than 98.5%) from Carlo Erba. The crucible was placed in an induction furnace and heated under an argon atmosphere of 300 mbar with medium frequency induction heating until the mixture was thoroughly melted and homogeneous thus forming a fusion. The fusion was then poured into a cold iron mould and allowed to cool to room temperature while still under the protective atmosphere of argon. The weight of alloy after fusion was not measured but no evaporates were noted during fusion. The alloy corresponds to the composition $Ba_2Pb$.

EXAMPLE 7

Figure 9:
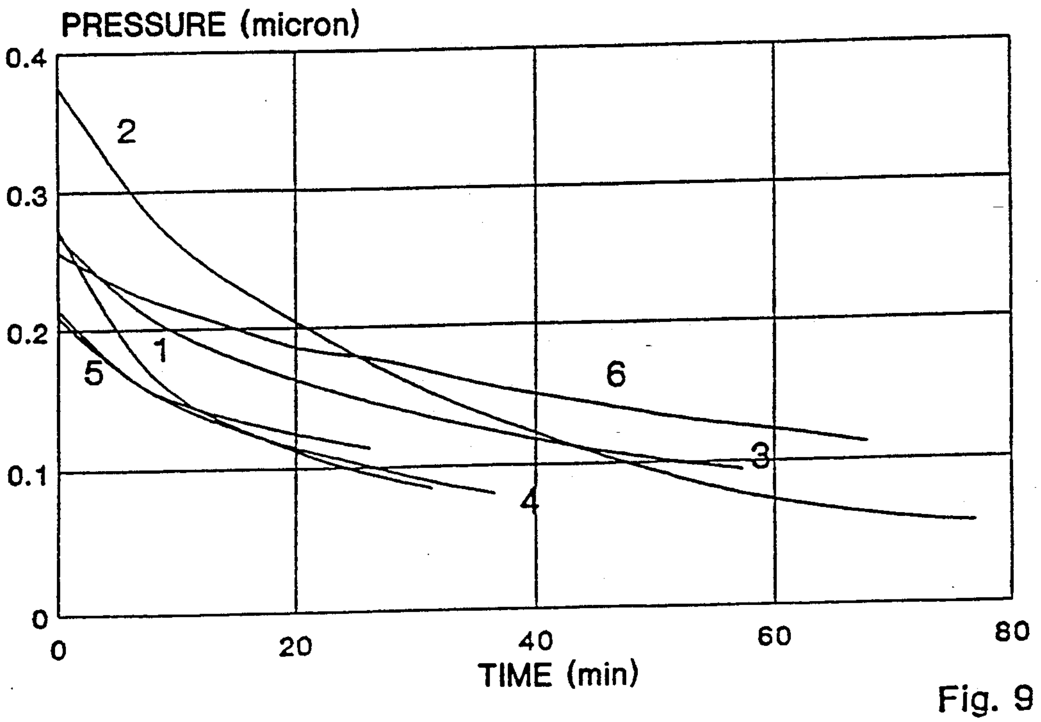
FIG. 9 shows the results of sorption tests performed on an alloy of barium-lead of the present invention.
Figure 10:
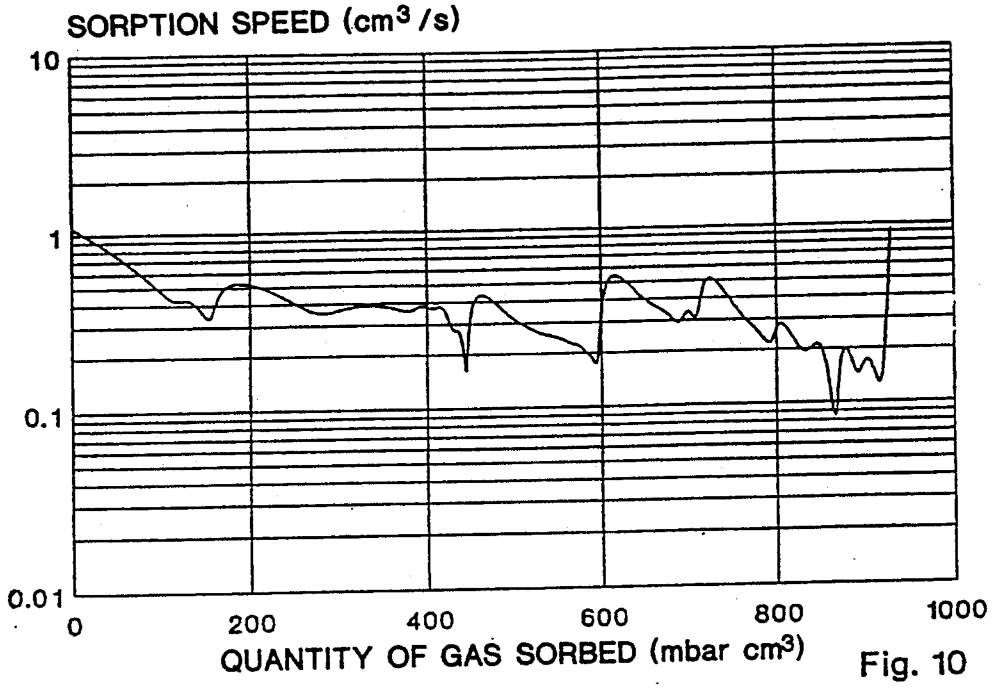
FIG. 10 shows the gas sorption speed derived from the curves of FIG. 9 as a function of the quantity of gas sorbed.
Figure 11:
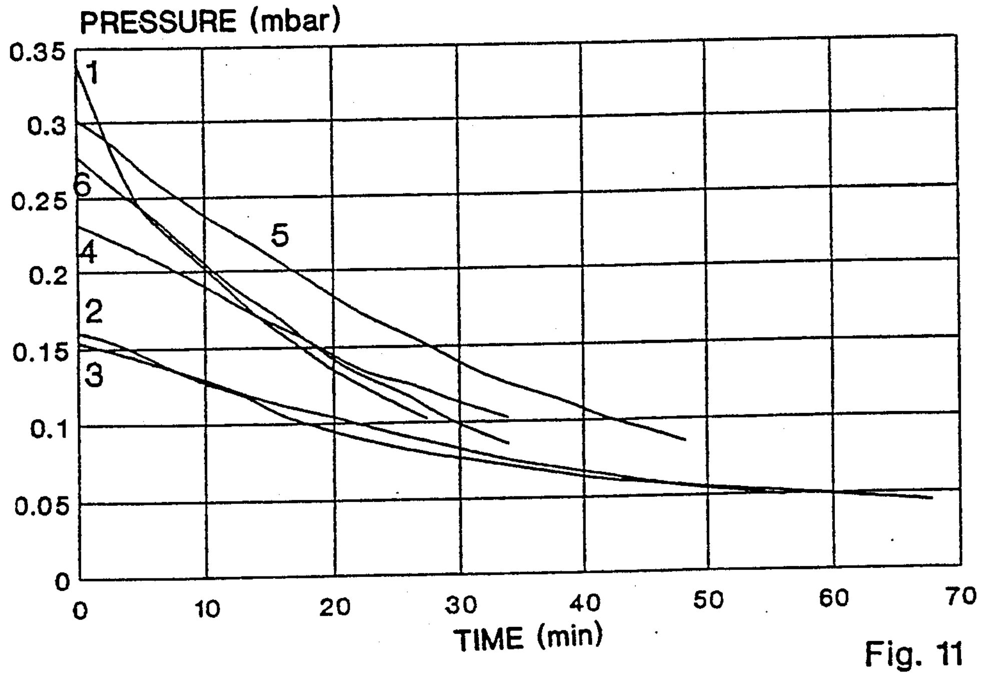
FIGS. 11-14 show the results of sorption tests performed on an alloy of barium-calcium-aluminium of the present invention.
Figure 12:
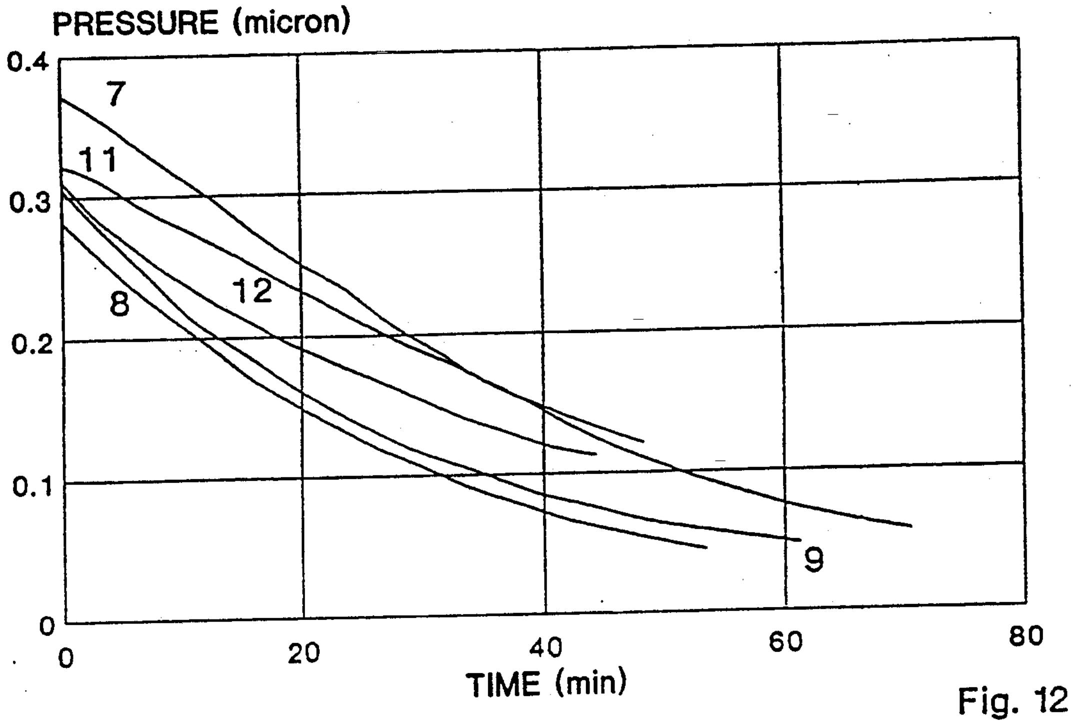
Figure 13:
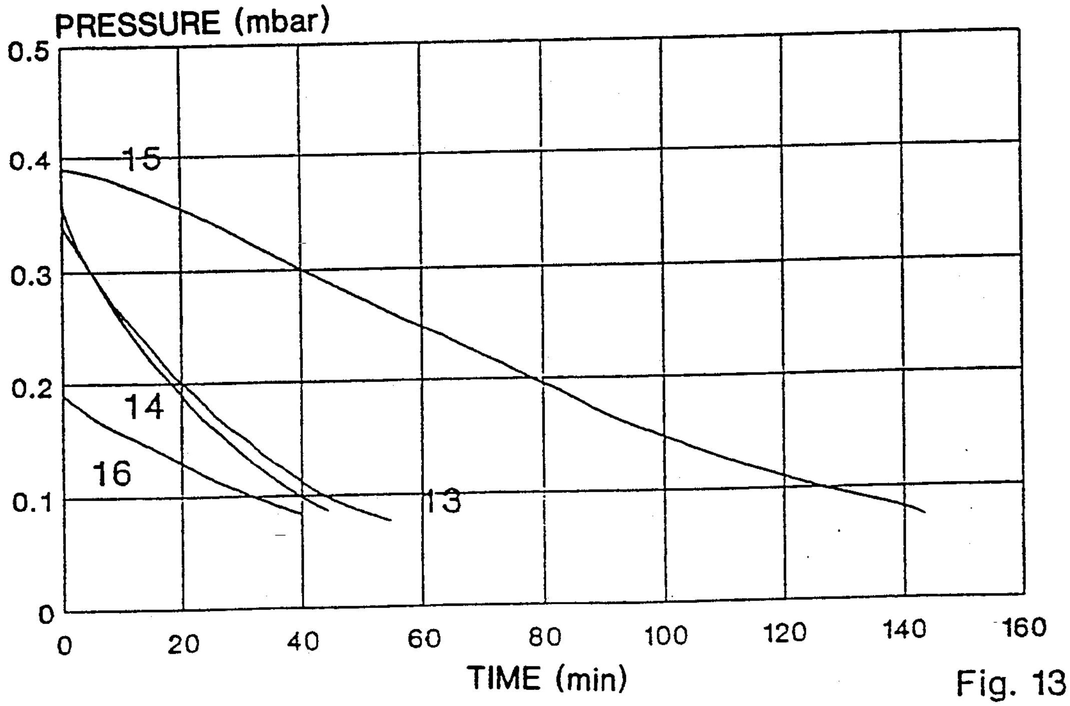
Figure 14:
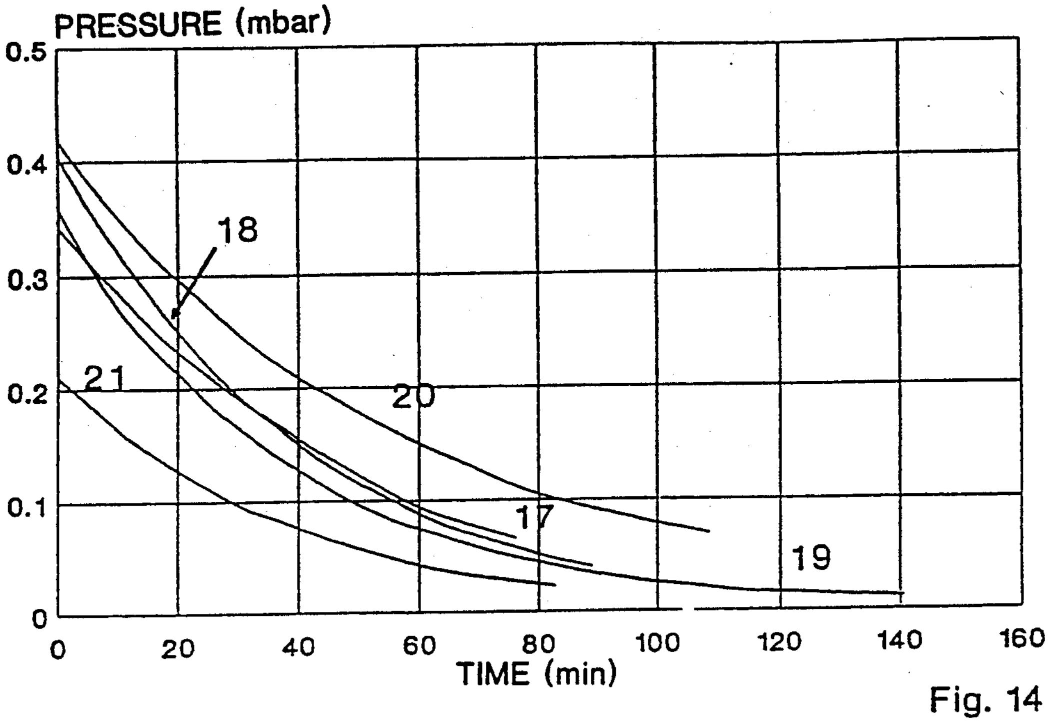

This example was designed to show the use of the alloy produced as in Example 6 in the process of the present invention. A barium-lead alloy as prepared in Example 6 above was placed in a glove box under a protective atmosphere of argon at slightly greater than 1 atmosphere pressure. The alloy was ground to a particle size of less than 1 mm with a pestle and a mortar and a sample of 11.47 g was sealed in a glass vessel of volume 0.28 liter. The sorption properties were measured as in Example 3 and are reported in FIG. 9. FIG. 10 shows the gas sorption speed derived from the curves of FIG. 9 by differentiation, as a function of the quantity of gas sorbed.

EXAMPLE 8

This example was designed to show how the manufacture another alloy useful in the process of the present invention. 311.35 g of commercial grade barium (purity greater than 98%) obtained from Degussa was placed in an iron crucible together with 90.8 g of granulated calcium from Carlo Erba of purity greater than 98.5% and 97.85 g of aluminium beads from SAVA (purity greater than 98.5%). The crucible was placed in an induction furnace and heated under an argon atmosphere of 400 mbar with medium frequency induction heating until the mixture was thoroughly melted and homogeneous thus forming a fusion. The fusion was then poured into a cold iron mold and allowed to cool to room temperature. The weight of the alloy after fusion was 486 g. The alloy corresponds to a composition of $Ba_{1.125}Ca_{1.125}+(Ba_{0.5}Ca_{0.5})_4Al_5$.

EXAMPLE 9

Figure 15:
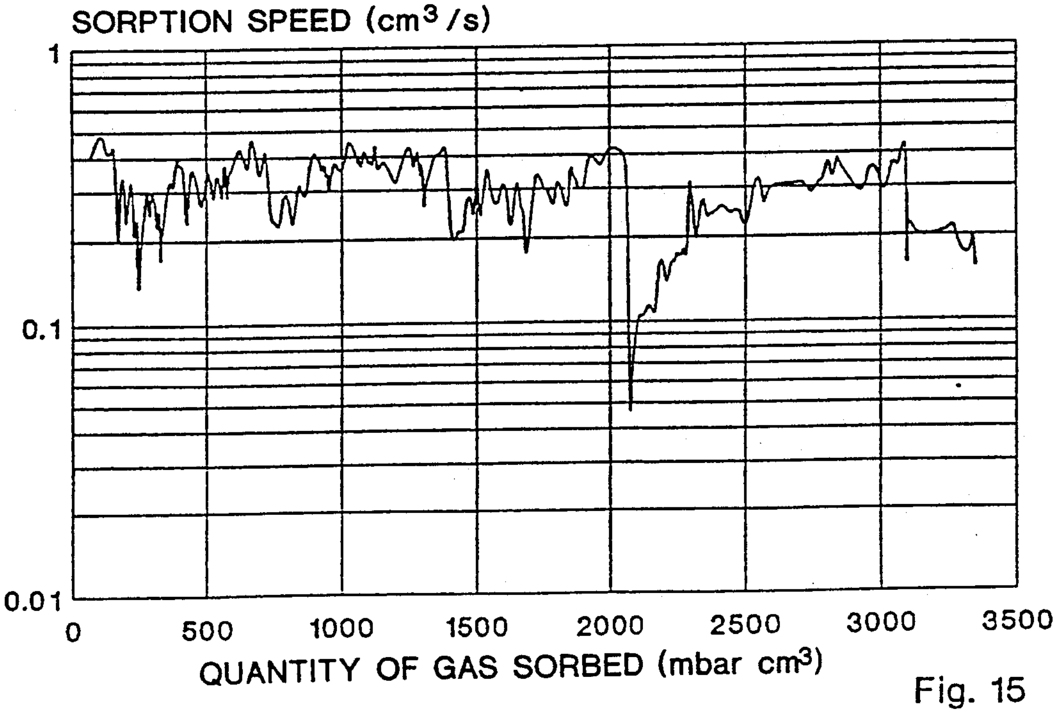
FIG. 15 shows the gas sorption speed derived from the curves of FIGS. 11-14 as a function of the quantity of gas sorbed.

This example was designed to show the use of the alloy produced as in Example 8 in the process of the present invention. A barium-calcium-aluminium alloy as prepared in Example 8 above was placed in a glove box under a protective atmosphere of argon at slightly greater than 1 atmosphere pressure. The alloy was then ground to a particle size of less than 0.3 mm with a pestle and mortar and a sample of 2.9 g was sealed in a glass vessel of volume 0.13 liter. The sorption properties were measured as in Example 3 and are reported in FIGS. 11-14. FIG. 15 shows the gas sorption speed derived from the curves of FIGS. 11-14, by differentiation, as a function of the quantity of gas sorbed. Although the invention has been described in considerable detail with reference to certain preferred embodiment designed to teach those skilled in the art how best to practice the invention, it will be realized that other modifications may be employed without departing from the spirit and scope of the appended claims.

We claim:

1. A process for sorption of residual gas in a vessel by a non-evaporated barium getter comprising the steps of:

i) comminuting an alloy of $(Ba_{1-x}A_x)_nB_m$ to particles under a vacuum or inert gas to produce a particulate alloy; and ii) placing the particulate alloy in the vessel; and iii) sealing the vessel thereby providing a sealed vessel; and iv) providing a partially evacuated atmosphere within the sealed vessel; and v) exposing the particulate alloy to the residual gas in the vessel at room temperature and absorbing the residual gas without vaporizing the particulate alloy and; wherein:

"A" is a metal selected from the group consisting of elements of Group IIa of the periodic table of elements, excluding barium, "B" is a metal selected from the group consisting of elements of Group Ib, IIb, IIIa, IVa, and Va of the periodic table of elements, "n" = a whole number, "m" = a whole number, "x" has a value equal to or greater than zero and equal to or less than 0.5.

2. A process for sorption of residual gas in a vessel by a non-evaporated barium getter comprising the steps of:

i) comminuting an alloy of $Ba_z+(Ba_{1-x}A_x)_nB_m$ to a particle size of less than 5 mm under a vacuum or inert gas to produce a particulate alloy; and ii) placing the particulate alloy in the vessel; and iii) sealing the vessel thereby providing a sealed vessel; and iv) providing a partially evacuated atmosphere within the sealed vessel; and v) exposing the particulate alloy to the residual gas in the vessel at room temperature and absorbing the residual gas without vaporizing the particulate alloy; wherein:

"A" is a metal selected from the group consisting of elements of Group IIa of the periodic table of elements, excluding barium, "B" is a metal selected from the group consisting of elements of Group Ib, IIb, IIIa, IVa, and Va of the periodic table of elements, "n" = 1, 2, 3, or 4, "m" = 1, 2 or 5, "x" has a value equal to or greater than zero and equal to or less than 0.5; and "z" has a value such that the total barium is not greater than 95% by weight.

3. A process of claim 2 in which A is selected from the group consisting of magnesium, calcium and strontium.

4. A process of claim 2 in which B is selected from the group consisting of copper, zinc, aluminium, tin and lead.

5. A process of claim 2 in which B is selected from silver, gold, cadmium, mercury, gallium, thallium, silicon, germanium, antimony and bismuth.

6. A process of claim 2 in which n is 1, 2, 3 or 4.

7. A process of claim 2 in which m is 1, 2 or 5.

8. A process of claim 2 in which $0 \leqq x \leqq 0.5$.

9. A process of claim 2 in which $0 \leqq z \leqq$ such a value that the total barium is not greater than 95% by weight.

10. A process of claim 2 in which the alloy is $Ba+BaCu$.

11. A process of claim 2 in which the alloy is $Ba+Ba_2Zn$.

12. A process of claim 2 in which the alloy is $Ba_2Pb$.

13. A process for sorption of residual gas in a vessel by a non-evaporated getter comprising the steps of:

i) comminuting an alloy of $Ba_{1.125}Ca_{1.125}$ with $(Ba_{0.5}Ca_{0.5})_4Al_5$ to a particle size of less than 5 mm under a vacuum or inert gas to produce a particulate alloy; and ii) placing the particulate alloy in the vessel; and iii) sealing the vessel thereby providing a sealed vessel; and iv) providing a partially evacuated atmosphere within the sealed vessel; and v) exposing the particulate alloy to the residual gas in the vessel at room temperature whereupon residual gas in the vessel is sorbed without vaporizing the particulate alloy.

14. A process for sorption of residual gas at temperatures less than 150° C. in a closed vessel by contacting the residual gas with a particulate alloy of $Ba_z+(Ba_{1-x}A_x)_nB_m$ wherein:

the particulate alloy has a particle size less than 5 mm, and sorption of residual gas without vaporizing the particulate alloy; and "A" is a metal selected from the group consisting of magnesium, calcium, and strontium; and "B" is a metal selected from the group consisting of copper, zinc, aluminum, tin and lead; and "n"=1, 2, 3, or 4, "m"=1, 2 or 5, "x" has a value equal to or greater than zero and equal to or less than 0.5; and "z" has a value such that the total barium is not greater than 95% by weight.

* * * * *